United States Patent [19]
Jarrabet et al.

[11] Patent Number: 5,350,557
[45] Date of Patent: Sep. 27, 1994

[54] IMPERMEABLE, ABRADABLE SEAL AND METHOD FOR THE PRODUCTION THEREOF

[75] Inventors: Gregory P. Jarrabet; Lixion Lu, both of DeLand, Fla.

[73] Assignee: Technetics Corp., Deland, Fla.

[21] Appl. No.: 764,204

[22] Filed: Sep. 23, 1991

[51] Int. Cl.$^5$ .............................................. B22F 3/26
[52] U.S. Cl. ........................................ 419/19; 419/27
[58] Field of Search .................................. 419/27, 19

[56] References Cited

U.S. PATENT DOCUMENTS

| | | | |
|---|---|---|---|
| 3,407,061 | 10/1968 | Hutkin | 75/208 |
| 3,519,282 | 7/1970 | Davis | 277/230 |
| 3,741,734 | 6/1973 | Dunham | 29/182.5 |
| 3,748,105 | 7/1973 | Reen et al. | 29/182.1 |
| 4,139,376 | 2/1979 | Erickson et al. | 75/229 |
| 4,155,755 | 5/1979 | Sara | 75/200 |
| 4,251,272 | 2/1981 | Sara | 75/200 |

FOREIGN PATENT DOCUMENTS 727556 2/1966 Canada .................................. 419/19

Primary Examiner—Donald P. Walsh
Assistant Examiner—Chrisman D. Carroll
Attorney, Agent, or Firm—Art Greif

[57] ABSTRACT

Gas turbine engines employ a variety of abradable liners to decrease the clearance between the rotating components and the surrounding casing. There is normally a trade-off between porosity, (and concomitant permeability) and the abradability of the liner material, such that materials with good abradability are permeable to gas flow—resulting in performance losses. Permeability of porous liners is decreased by infiltrating the liner with a low-viscosity liquid containing a metal or metal oxide. After infiltration, the viscosity of the liquid is substantially increased to prevent its egress from the porous liner. Thereafter, the liner is heated at an elevated temperature to drive off the remaining liquid and provide an oxide which blocks the passages and decreases the permeability of the liner.

6 Claims, 3 Drawing Sheets

FILLED WITH $Cr_2O_3$ MICROSPHERES
(SURFACE VIEW)

*CONVENTIONAL, UNFILLED SINTERED FIBERS*

*FILLED WITH Ni POWDERS*

FILLED WITH NICKEL OXIDE

FILLED WITH $Cr_2O_3$ MICROSPHERES
(SURFACE VIEW)

FILLED WITH Cr₂O₃ MICROSPHERES
(CROSS SECTION VIEW)

IMPERMEABLE, ABRADABLE SEAL AND METHOD FOR THE PRODUCTION THEREOF

TECHNICAL FIELD

This invention relates to the production of an abradable seal liner for use in turbomachinery. The liner material which exhibits a superior combination of abradability and decreased permeability to gas flow, is produced by infiltrating the pores of a rigid, skeleton structure with a liquid containing a high melting point metal which binds to the skeleton structure.

BACKGROUND

The efficiency of gas turbine engines is, to a great degree, dependent on the clearance between the free ends of the rotating component and the surrounding casing. To substantially decrease clearance losses between the rotor blades and the casing, a variety of abradable linings have been employed, so that the rotating component can cut a groove into the abradable lining with minimal damage to the rotor blades. For low temperature applications, such as exist at the inlet sections of a gas turbine engine, the abradable lining can be constructed from a variety of rubber-like materials to provide the desired tight operating clearance. However, as stage temperatures increase, such as those present in the compressor and turbine sections of the engine, rubber-like materials can no longer be employed. For such higher temperature applications (i.e., greater than 300° and generally greater than 500° C.) high melting point materials, such as metals, cermets or ceramics must be employed. Dense (non-porous) metals, cermets, or ceramics can not provide the desired degree of abradability, since the amount of energy required to cut a groove into the dense material and the amount of wear on the blade tips would be much too great. Therefore, the art has generally resorted to various low density metallic or ceramic linings to provide the requisite abradability.

Abradable metal linings are generally, (i) sprayed onto the casing or (ii) bonded, e.g. by brazing, to the casing. The latter abradable liner materials are produced from rigid, skeleton-like matrix structures, i.e, structures having pores therein, such as honeycomb, or sinter bonded particulate metals (powders or fibers).

As noted above, a low density, generally porous material must be employed to permit the rotating component to wear into the liner material without incurring unduly high rub energy losses and unduly high wear of the rotating component. Such porous liners will generally exhibit density ratios (ratio of the density of the structure to the absolute density of the metal used in the structure—expressed in percent) of about 15 to about 35%. An unfortunate corollary to the use of porous materials is their high permeability to gas flow—resulting in performance losses, i.e., leakage between the blade tip and the pores of the abradable liner. To reduce such leakage the art has attempted to use metallic powders to fill at least a portion of the pores. Examples of these attempts are shown in U.S. Pat. Nos. 3,844,011 and 3,519,282. The products produced by either of these patented processes are subject to a similar deficiency, i.e., substantially decreased leakage is only achieved by using unduly large amounts of metal powders—which results in a high density liner and the poor rub characteristics (abradability) associated therewith. For example, it was found that the infiltration of a metal fiber structure (analogous to the one shown in the '282 patent) with sufficient metal powders to increase the density ratio from 21 to 25% provided only a slight improvement (decrease) in leakage, coupled with a significant deterioration of abradability characteristics.

Notwithstanding the rather meager improvement in decreased leakage achieved by metal powder impregnation, this technique, for practical considerations, is generally limited to abradable liner materials with comparatively large pores. The sinter-bonded, metal fiber products most commonly employed in gas turbines are made of extremely fine diameter fibers—with pore diameters generally below 40 microns. Such products are difficult to completely impregnate, even with dispersions of the finest metal particles (approx. 4 microns) presently commercially available.

DISCLOSURE OF INVENTION

It has been found that substantially complete infiltration of porous metal skeleton-like structures, even those with comparatively fine pores ("pore" includes any small opening, such as the cells of honeycomb structures), can readily be achieved utilizing certain liquids which contain the desired metal, preferably a transition metal. The liquid may be in the form of a molten salt of the metal, a solution containing an effective amount of the metal or a colloidal dispersion containing an effective amount of the metal in elementary or combined form. After infiltration of the skeleton, egress of the infiltrated metal from the skeleton structure is prevented. This may be achieved by immediate heating to form a stable derivative or, more often, by increasing the viscosity of the liquid. Thus, if the liquid is a molten salt, viscosity increase is achieved by permitting the liquid to cool and solidify, while if the liquid is a solution or a sol viscosity is increased by drying. The infiltrated structure will, in any event, be heated in air, nitrogen, etc., at an elevated temperature to cause the infiltrated metal to convert to a stable compound (depending on the atmosphere employed) and to favor bonding to the skeleton structure. It has been found, using a preferred embodiment of this technique, that infiltration of small amounts of insitu-formed, transition metal oxides, can nevertheless plug or otherwise fill the pores to a degree which achieves at least an order of magnitude decrease in the permeability of the liner material. The resultant liner materials, in addition to their use as abradable seals, will have utility as clutch plates, brake pads, etc.

BRIEF DESCRIPTION OF DRAWINGS

FIG. 4(a) at a magnification of 55x, shows the extent of microsphere coverage at the surface of the segment, while FIG. 4(b) at 344x, is a cut, through the center of the segment—showing how the spheres (the thin, arcuate lines) bridge the fibers which define the pores of the matrix, thus blocking the pores.

MODES FOR CARRYING OUT THE INVENTION

Figure 1:
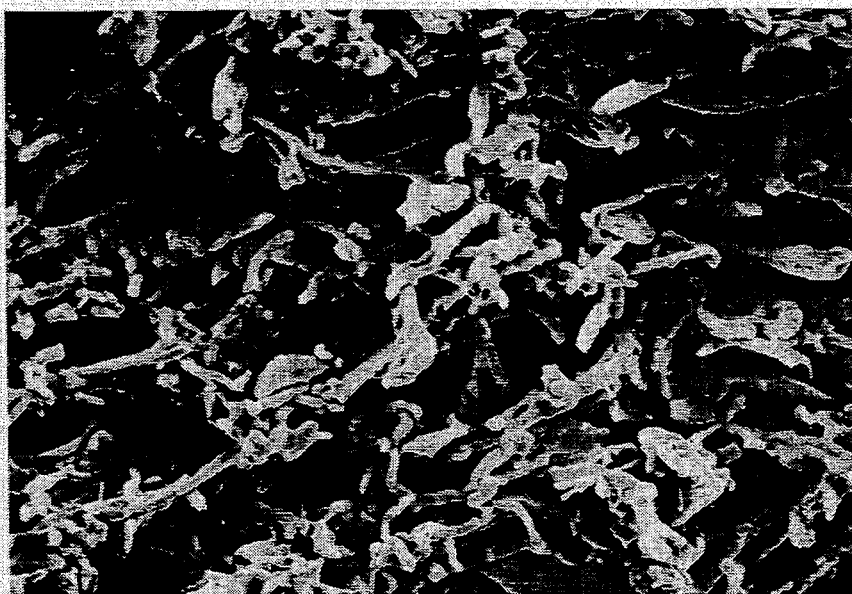
FIG. 1 is a photomicrograph (surface appearance at 195x) of a conventional, unfilled fiber metal matrix which shows the degree of porosity existing in a fiber metal matrix having a density ratio of 21%.
Figure 2:
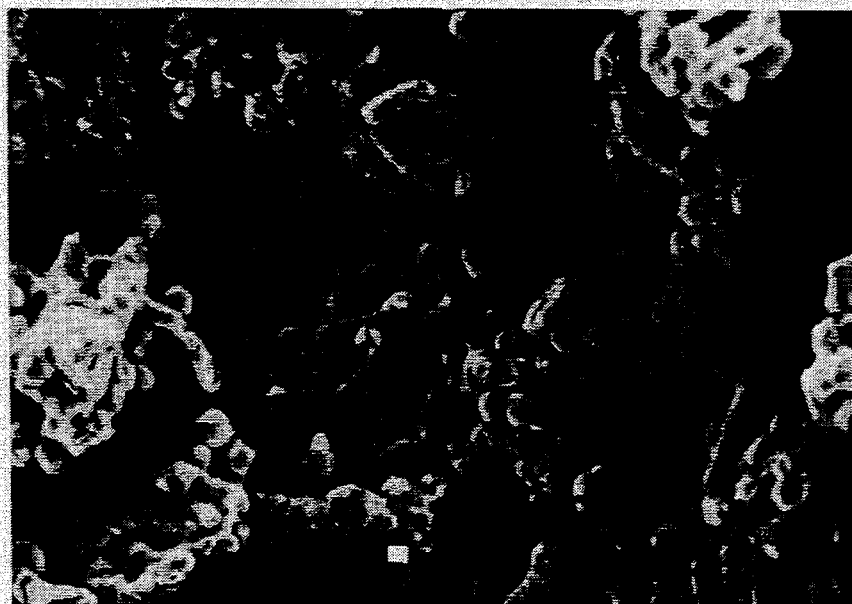
FIG. 2 is a photomicrograph (surface at 653x) of a similar fiber metal matrix filled with Ni powders.

FIG. 1 is a photomicrograph of a conventional sinter-bonded, fiber metal liner segment, showing the degree of porosity and interconnecting air passages which normally exist in such liners. The fibers in such liners exhibit irregular shapes, but have diameters which normally fall within the range of 5 to 25 microns and aspect ratios of 50 to 80:1. Similar, fiber metal segments were filled using three different methods, described in greater detail in the three examples below. The first product, FIG. 2, is similar to that suggested in U.S. Pat. No. 3,519,282, in which a slurry of fine nickel powders was forced into the open pore structure, dried and heated to bond the powders to each other, and to the fibers. As seen from the results reported in the Table, due to process limitations,. infiltration of powders was limited to the surface regions of the liner segment, which nevertheless resulted in a density increase of about 4%, and provided only a minor improvement (decrease) in gas leakage. Examples 2 and 3 utilized methods in accord with the instant invention, in which a liquid containing the desired metal is employed to achieve uniform infiltration throughout the entire metal matrix. Thereafter, the infiltrated metal is heated in air such that the resulting oxidic material either: (i) blocks the interconnecting passageways to achieve materially decreased permeability, without completely filling the pores or (ii) substantially fills the pores with oxidic microspheres to achieve an even greater decrease in leakage.

Permeability or leakage is evaluated by forcing compressed air through the test specimen and measuring the degree of blockage. Compressed air at 69 KPa (gauge) is delivered at a rate of 10.38 L/min through an open metal tube (0.64 cm I.D.) having flexible plastic tubing at the end thereof to effect a reasonably tight seal with the surface of the material being evaluated. Some degree of leakage is nevertheless noted, even for impermeable materials, due to the nonconformance of the plastic tip with a rough surface. The degree of blockage is noted on a flow gauge. Thus, as seen from the Table, the conventional material gives average readings of 10.2 L/min indicating very minor blockage.

Abradability is evaluated by slowly advancing the specimen into a rotating blade tip or knife edge. The test apparatus consists of an air turbine which drives the blade tip (simulating the blades encountered in turbine engines). The turbine can be operated at up to 48,000 rpm—corresponding to a surface velocity of the rotor element of 305 m/s. The abradable specimen is mounted on a motorized table which moves at a controlled rate and controlled depth of penetration into the rotor element. The motorized table is instrumented to measure face loads, rotor speed loss and torque resulting from the rub interaction. The torque developed during the rub is the product of the rotor mass moment of inertia and the rotor deceleration; while the rub energy is a function of speed lost during the interaction.

Example 1, Infiltration with Metallic powders

A conventional, fiber metal matrix (shown in FIG. 1) was found to have a pore size distribution of from about 2 to 40 microns, with a majority of the pores being greater than 4 microns. This is significant because of the availability of nickel powders with an average particle size of 4 microns. Ni powders offer the possibility of a good match with the Ni based alloy ("HASTELLOY X") of the fiber metal matrix. U.S. Pat. No. 3,519,282 suggests that permeability of sintered, fiber metal matrixes can be substantially decreased by infiltration of metal powders; although this patent is silent as to how such infiltration may be achieved. Infiltration was achieved, utilizing an ultrasonic gun. A sheet segment of the sintered, fiber metal matrix was horizontally supported and immersed in a bath of water. A Ni-powder slurry (50 g Ni in 100 ml of water) was applied to the top surface of the immersed sheet, and an ultrasonic gun was then scanned over the entire surface of the sheet to enhance infiltration of the powders. To achieve a greater degree of infiltration, the sheet was then turned, so that the other surface faced upward and the procedure was repeated—resulting in a weight increase of only 19% (due to incomplete filling, particularly in the midsection of the sheet). The resultant product, shown in FIG. 2, was evaluated to determine the decrease in permeability achieved by the infiltration of Ni powders. As noted above, the conventional, unfilled material exhibits only minor blockage with readings of 10.2 L/min. Analogously, the best of the Ni powder infiltrated samples exhibited only a minor decrease in leakage—with a reading of 9.7 L/min. Because of the meager improvement in impermeability, quantitative abradability tests were not run. However, a cursory test showed a marked decrease in abradability.

Example 2, Infiltration with Molten Salt

Figure 3:
FIG. 3 is a photomicrograph (surface at 643x) of a fiber metal matrix filled with nickel oxide, to block the inter-connecting pores of the structure. The amount of nickel oxide resulted in only a moderate increase in the density of the material.

The difficulties encountered in attempting to infiltrate the fiber metal matrix with powders, led to the investigation of infiltration with liquids. A number of low melting point salts (nitrates, chlorides and hydrides) were evaluated for their ability of the molten salt to penetrate and remain within the matrix, upon cooling of the salt. The most significant improvement in decreased permeability was achieved utilizing $NiNO_3$ powders which were spread on the top surface of the porous matrix, heated at 80° C. to melt the powders—enabling the resulting liquid to infiltrate the pores, and wet the matrix fibers. The infiltrated matrix was cooled, to solidify the salt and prevent its egress from the structure. Subsequent heating at 538° C., for 0.5 hour in air drove off the $NO_2$—leaving nickel oxide firmly adhering to the fibers and blocking a portion of the interconnecting passageways of the matrix (FIG. 3). Mercury porosimetry showed that average pore size was substantially decreased and referring to the Table it may be seen that blockage was significant enough to reduce leakage to less than 50% of the unfilled matrix. The weight of the sample increased by about 42%, and abradability was somewhat impaired, but not to the same extent as that encountered with the Ni powder sample. It is thought that the oxide coating provides a degree of lubricity, which counters the effect of increased density.

Example 3, Infiltration with a Solution of a Metal Salt

It was found that when a porous matrix is immersed in an aqueous solution of metal salt, permitting the solution to infiltrate the pores, that the surface tension of the fine pores will often be sufficient to prevent undue drainage of the liquid from within the pores. It is known (see, for example, U.S. Pat. No. 4,349,456) that certain metal solutions and oxidic sols can be dried to form gel-like substances, which upon firing at elevated temperatures are capable of forming hollow microspheres, composed primarily of metal oxides. It was discovered that a solution of chromic acid, $H_2CrO_4$, when partially dried will form such a gel-like material within the pores of the fiber metal matrix.

Figure 4A:
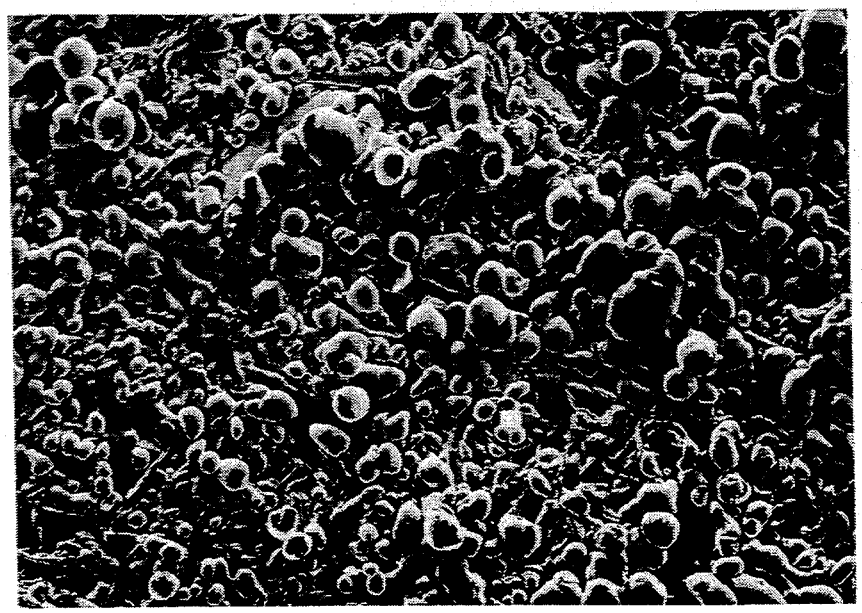
FIGS. 4(a) and (b) are photomicrographs of a similar fiber metal segment filled with chromium oxide microspheres.
Figure 4B:
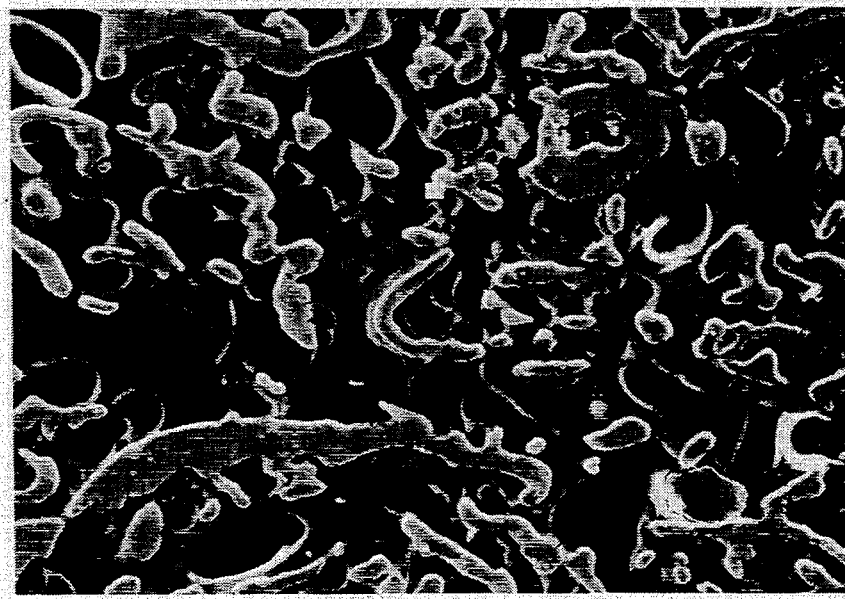

To promote wetting of the fibers and to enhance the uniformity of filling of the matrix, the fiber metal segment is oxidized in air at 538° C. for 20 minutes. The segment is then immersed in a solution of chromic acid (S.G.=1,645 g/cc). Upon complete infiltration, the segment is removed from the bath, drained, dried in an oven set at 80° C. for 40 minutes and fired by placing it in a furnace set at 720° C. for 7 minutes. The resulting product is substantially completely filled with microspheres of chromic oxide. FIG. 4(a) shows the extent of microsphere coverage on the surface of the fiber metal segment; while FIG. 4(b) is a cut taken from the center of the filled segment, which shows how the spheres block the channels of the matrix. The hollowness (i.e., sphere diameter to wall thickness) of the microspheres is evidenced in FIG. 4(b), by comparing the thickness of the irregular fibers (normally within the range of 5 to 25 microns) to the wall thickness of the microspheres. The resulting products exhibit a leakage of less than 1.4 L/min—due primarily, as noted above, to leakage between the nonconforming tip and the irregular surface of the specimen. Even though the product exhibited a weight increase of about 28%, the thin wall character and friability of the microspheres, coupled with the lubricity of the chromic oxide coating over a substantial portion of the fibers, resulted in a product exhibiting improved abradability as evidenced from the results reported in the Table.

TABLE

Permeability & Abradability of Abradable Liners

| Segment Type | Leakage Test[1] (L/min) | Abradability[2] Rub Energy (Joules/cm$^3$) | Torque (Joule-Sec) |
| --- | --- | --- | --- |
| Unfilled Matrix | 10.4 | 1,962 | 171.1 |
| Matrix with Ni-Powders | 9.7 | (2) | |
| Matrix with Ni-Oxide Coat | 4.7 | (2) | |
| Matrix with Cr-Oxide Microspheres | 1.4 | 1,440 | 98.4 |

[1] Average of 3 readings
[2] Data for these samples are not comparable. They were evaluated under a different test method, which utilized different blades. The Rub Energy of the Ni-Powder sample was markedly impaired, while that of the Ni-Oxide coated sample was also impaired, but to a lesser degree, relative to the "unfilled" sample.

It is seen from the results reported in the Table that a superior combination of improved abradability with substantially decreased permeability is achieved by utilizing a liquid infiltrate capable of foaming, and preferably in which the foam so produced is capable of forming hollow microspheres. In general, abradability will deteriorate with increased density of the liner material, primarily because the blades have more material to push in front of them. However, the use of hollow microspheres can provide very effective filling of the pores of the matrix (or, analogously the open cells of honeycomb), without adding concomitantly to the weight of the liner. Various gel-like or viscous solutions are capable of forming when rapidly heated to elevated temperatures. The capability of such substances to foam may be based, for example, on: the incorporation of a blowing agent in the solution or sol, or the entrapped solvent (e.g. water) may itself act as a blowing agent—as in the case of chromic acid. U.S. Pat. No. 4,349,456 (Col. 4, lines 6–54) lists a variety of materials with the potential not only to foam, but to form oxidic microspheres. Chromic acid is particularly preferred for "HASTELLOY X" fibers, because of its effectiveness in reacting with the "HASTELLOY X"—enhancing, (i) the abradability of the sintered fiber metal matrix, and (ii) the interfacial bond between the metal fibers and the ceramic filler.

What is claimed is:

1. In the production of an abradable liner material, comprising a rigid, skeleton-like matrix, the pores of which are at least partially filled with a metal or metal compound, to substantially decrease the permeability of the liner under the high temperature applications encountered in such turbomachinery, the improvement which comprises, infiltrating the pores of said matrix to a depth beyond the surface regions of the liner with a solution or dispersion containing an effective quantity of at least one metal in elementary or combined form, said solution or dispersion having a viscosity low enough to adequately penetrate the pores of the matrix, the quantity of said metal being sufficient, such that upon heating, the gas permeability of the liner will be less than 50% of the unfilled matrix, preventing the egress of the infiltrate from the matrix, heating the infiltrated matrix under conditions which cause the infiltrate to form, and form a derivative which: (i) is stable at such high temperatures and (ii) adheres to the matrix material, such that it fills the pores thereof to a degree sufficient to achieve said decrease in the gas permeability of the liner.

2. The method of claim 1, wherein the egress of the infiltrate is prevented by drying the infiltrated matrix at a temperature and pressure sufficient to drive off a major portion of the solvent.

3. The method of claim 2, wherein said drying is conducted to convert said infiltrate into a substance capable of foaming when rapidly heated to an elevated temperature.

4. The method of claim 3, wherein said heating is sufficiently rapid to convert the substance into microspheres or closed cells which fill the pores of said structure.

5. The method of claim 4, wherein a majority of said pores have an effective diameter below 40 microns.

6. The method of claim 4, wherein said infiltrate is an aqueous solution of chromic acid.

* * * * *